United States Patent
Van Haaren et al.

(10) Patent No.: US 8,739,823 B2
(45) Date of Patent: Jun. 3, 2014

(54) DEVICE FOR CAUSING TURBULENT FLOW IN A TANK ASSEMBLY

(75) Inventors: Christopher A. Van Haaren, Warwick, RI (US); Kenneth Cerpovicz, Warwick, RI (US)

(73) Assignee: AMTROL Licensing Inc., West Warwick, RI (US)

( * ) Notice: Subject to any disclaimer, the term of this patent is extended or adjusted under 35 U.S.C. 154(b) by 607 days.

(21) Appl. No.: 12/924,652

(22) Filed: Oct. 1, 2010

(65) Prior Publication Data

US 2012/0080112 A1 Apr. 5, 2012

(51) Int. Cl.
*F17D 1/00* (2006.01)

(52) U.S. Cl.
USPC ...................................... 137/590; 137/561 A

(58) Field of Classification Search
USPC ........ 137/561 A, 590, 592, 808, 809; 138/39; 4/541.6; 239/222, 222.11, 223, 224
See application file for complete search history.

(56) References Cited

U.S. PATENT DOCUMENTS

| | | | |
|---|---|---|---|
| 2,946,345 A * | 7/1960 | Weltmer | 137/590 |
| 3,276,698 A * | 10/1966 | Wood | 239/452 |
| 4,394,966 A * | 7/1983 | Snyder et al. | 239/127 |
| 5,386,925 A | 2/1995 | Lane | |
| 5,551,590 A | 9/1996 | Mazur et al. | |
| 6,014,987 A * | 1/2000 | List et al. | 137/549 |
| 6,840,275 B2 * | 1/2005 | Grayson | 137/590 |
| 7,216,673 B2 | 5/2007 | Gremour et al. | |
| 2006/0131314 A1 | 6/2006 | Lombari et al. | |
| 2008/0023083 A1 * | 1/2008 | Muggli et al. | 137/592 |
| 2010/0012665 A1 | 1/2010 | Morrissey et al. | |

FOREIGN PATENT DOCUMENTS

KR 20-0397608 10/2005

OTHER PUBLICATIONS

International Search Report and Written Opinion of the International Searching Authority (ISA) dated Apr. 26, 2012 relating to co-pending PCT/US2011/054352.
Brochure of Flexcon Industries, "Raising the Steel Well Tank Bar Since 1988," © 2007.

* cited by examiner

*Primary Examiner* — John K Fristoe, Jr.
*Assistant Examiner* — Angelisa Hicks
(74) *Attorney, Agent, or Firm* — Edwards Wildman Palmer LLP; Scott D. Wofsy; Lisa Swiszcz

(57) ABSTRACT

Disclosed is a device for causing turbulent flow in a tank assembly that has an internal fluid cell and a fitting for allowing fluid to enter and exit the fluid cell from the exterior of the tank assembly. The device includes a main body portion and first and second retaining arms. The first and second retaining arms extend from the main body portion of the device and are adapted and configured for supporting the device substantially within the fitting of the tank assembly. A plurality of curved vane elements extend from the main body portion which cause turbulent flow in the fluid cell of the tank assembly by redirecting fluid entering the tank assembly axially through the fitting in a non-axial direction into the fluid cell.

7 Claims, 5 Drawing Sheets

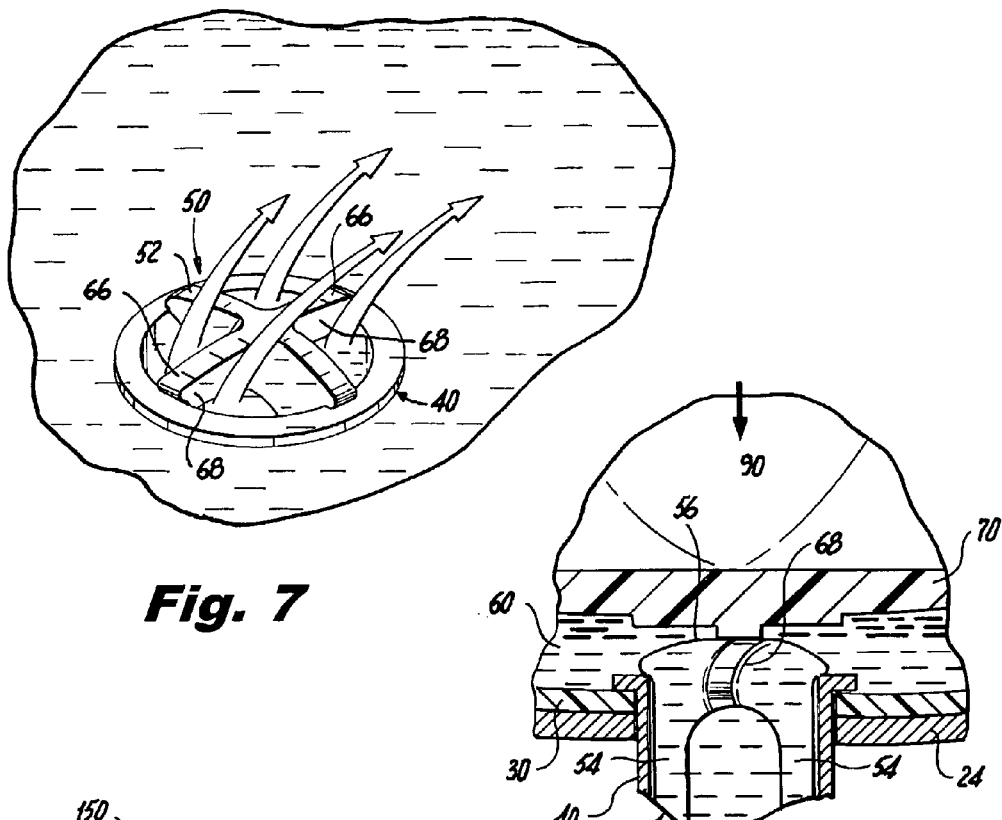
Fig. 7
Fig. 8
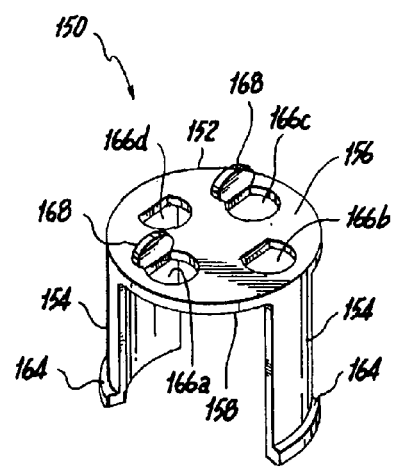
Fig. 9
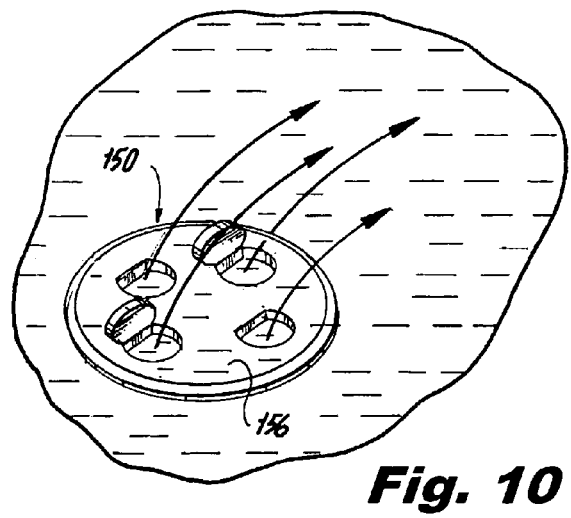
Fig. 10

DEVICE FOR CAUSING TURBULENT FLOW IN A TANK ASSEMBLY

BACKGROUND OF THE INVENTION

1. Field of the Invention

The subject invention is directed to a device for causing turbulent flow in a tank assembly, and more particularly to, a device associated with a tank's fluid inlet which creates turbulent flow within the tank, a still more particularly to, a device for use with a tank assembly, such as a well tank, which includes a plurality of vane elements that alter the direction of fluid flow entering the tank so as to cause turbulent flow within the tank.

2. Description of the Related Art

Water systems that provide and distribute well water domestically in rural parts of the country typically include a pump to draw water from the well; pipes or other conduits through which water travels; and a tank for storing water, e.g., a well tank. Well tanks, e.g., expansion tanks, are structured and arranged to store water until demanded and to accommodate internal pressures of the system. To this end, well tanks typically provide an air cushion for the supply water.

Generally, the water chamber in the interior of the tank assembly that stores water is in fluid communication through a fitting with the pipes or conduits of the domestic water system. By design, the water chamber is structured and arranged to provide an operating pressure, e.g., about 20 to 40 pounds per square inch ("psi"), to the water system. To accomplish this, a compressible gas chamber contains a pressurized gas, e.g., nitrogen or, more preferably, air, that can force water through the water system and that, further, can prevent creation of negative or back pressures in the water system during the cyclical demand for water and/or volume changes associated with the change in water temperature. If the pressure in the water chamber falls below the operating pressure, the pump is activated and water is added to the water chamber of the expansion tank until the water chamber again provides the operating pressure.

In any closed system containing air and water that undergoes natural or artificial temperature changes, the likelihood of problems stemming from interaction of air and water is great. Air is soluble in water and water readily absorbs air. Without an air cushion, or, more specifically, air pressure to force water through the system, a pressure pump may be needed constantly. Optionally, an air surge chamber can be provided that is not in direct contact with the water, thereby eliminating the need of the pressure pump operating every time a faucet was turned on. Pressure pumps and surge chambers increase the cost of a water system.

To address these shortcomings, conventional expansion and well tanks (collectively "tank assemblies") typically include impermeable diaphragms, or bladders, to separate the interior of the well tank into two chambers, or cells: a liquid, or water, chamber and a compressible, or pressurized, gas chamber. As water is pumped from a well into the tank assembly, the volume of the water in the water chamber increases, causing the diaphragm to contract the volume of the pressurized gas chamber. As the volume of the pressurized gas chamber decreases, the gas pressure in the pressurized gas chamber increases. As a result, when water for the tank is demanded by the water system, the gas in the pressurized gas chamber forces the water into the water system. Consequently, the volume of water in the water chamber decreases and the volume of the pressurized gas chamber increases. As a result, the pressure of the pressurized gas decreases.

Conventional diaphragms are constructed of a non-porous, elastic material, e.g., plastic or butyl rubber, and are sealed at the periphery or sidewall of the tank to provide an air- and watertight seal. Not only does use of a diaphragm avoid the above-described air-water problems, but, also, separation of water from the pressurized gas is desirable because water in the presence of oxygen produces oxidation that can damage metal or other portions of the system and, furthermore, can aerate the water, which can affect water quality.

An example of a conventional tank assembly is provided in commonly assigned U.S. Pat. No. 5,386,925 to Lane, which is herein incorporated by reference in its entirety. The Lane patent provides an expansion tank that includes a deformable diaphragm that divides the tank into two sections. The diaphragm separates the gas in the one section of the tank from the water in the other section of the tank and the rest of the system. The gas section is pre-charged with gas under pressure so that the diaphragm is displaced to increase or decrease the volume of this section according to the variations of the volume of water in the other section.

In certain well tank constructions, to provide some protection from corrosion, the inner surface of the liquid chamber portion of the metal expansion tank is covered by a water, or liquid impervious liner.

A disadvantage associated with conventional tank assemblies, such as the one disclosed in Lane, is that sediment builds up in the tank over time and ultimately degrades the tank. As noted above, water is pumped into the fluid cell of the tank from a well pump. In many parts of the country, the well water contains sediment. As shown in FIG. 1 of U.S. Pat. No. 5,386,925 to Lane, the water enters the tank through a fitting 130 vertically and in an axial direction. Over time, the sediment contained in the water settles to the bottom of the tank where it is undisturbed and remains for the life of the tank.

An additional problem encountered in some conventional tank assemblies is that pockets of stagnant water develop within the fluid cell, resulting in the water becoming stale.

Therefore, it would be desirable to provide a tank assembly that is capable of removing the sediment from within the water cell and preventing pockets of stagnant water from developing. Moreover, it would be desirable to provide a low-cost solution to the above-mentioned problems which can be easily adapted to existing tank designs.

SUMMARY OF THE INVENTION

The present invention is directed to a device for causing turbulent flow in a tank assembly that has an internal fluid cell and a fitting for allowing fluid to enter and exit the fluid cell from the exterior of the tank assembly. The device includes, inter alia, a main body portion, first and second retaining arms. The main body portion defines a central axis for the device and has a top surface, a bottom surface and radially opposed lateral side walls.

The first and second retaining arms extend from the bottom surface of the main body portion of the device and each retaining arm includes a radially outer surface located at a distal end thereof which is adapted and configured for supporting the device substantially within the fitting of the tank assembly.

The device further includes a plurality of vane elements, wherein at least one vane element extends from each of the opposing lateral side walls of the main body portion of the device. Each vane element includes a curved surface which is adapted and configured for causing turbulent flow in the fluid cell of the tank assembly by redirecting fluid entering the tank assembly axially through the fitting in a non-axial direction into the fluid cell.

Preferably, the device includes two vane elements, wherein one vane element projects from each of the opposing side walls of the main body portion of the device. However, those skilled in the art will readily appreciate that more than two vane elements can be provided without departing from the inventive aspects of the present disclosure.

It is envisioned that the plurality of vane elements are each adapted and configured to redirect fluid entering the fluid cell in the same direction. Alternatively, the vane elements can be arranged such that direct the fluid of fluid in differing directions.

In certain constructions of the present invention, the main body portion of the device includes radially opposed ends which define a radiused shoulder for supporting the device substantially within the fitting of the tank assembly. Still further, it is also envisioned that the plurality of vane elements can also each include a radiused shoulder for securing the device substantially within the fitting of the tank assembly.

Preferably, the retaining arms are resilient and can be flexed radially inward so as to allow the device to be inserted into the fitting of the tank assembly. In certain constructions, the radially outer surface of the retaining arms includes a projecting ledge that secures the device within the fitting of the tank assembly.

The present invention is also directed to a tank assembly that includes, among other elements, an outer housing that defines an interior fluid cell; a fitting secured to the outer housing which extends from an exterior of the housing to the interior fluid cell; and a flow diverter associated with the fitting. The fitting defines a flow port for allowing fluid to enter and exit the fluid cell and the flow diverter creates turbulent flow within the interior fluid cell by redirecting fluid entering the tank assembly axially through the fitting in a non-axial direction into the fluid cell. In certain applications, the tank assembly is a well tank.

In certain embodiments of the present invention, the tank assembly further includes an inner liner supported within the housing. The inner liner defines a storage chamber that contains the interior fluid cell. Still further, the tank assembly can also include a diaphragm that is supported within the storage chamber of the inner liner and separates the fluid cell from a pressurized gas cell.

In a preferred embodiment, the flow diverter includes a main body portion that defines a central axis for the flow diverter and has a top surface, a bottom surface and radially opposed lateral side walls. The flow diverter also includes first and second retaining arms which extend from the bottom surface of the main body portion. Each retaining arm includes a radially outer surface located at a distal end thereof which is adapted and configured for supporting the flow diverter substantially within the fitting of the tank assembly.

The flow diverter further includes a plurality of vane elements, wherein at least one vane element extends from each of the opposing lateral side walls of the main body portion of the flow diverter. Each vane element includes a curved surface which is adapted and configured for causing turbulent flow in the fluid cell of the tank assembly by redirecting fluid entering the tank assembly axially through the fitting in a non-axial direction into the fluid cell.

Preferably, the flow diverter includes two vane elements, wherein one vane element projects from each of the opposing side walls of the main body portion of the flow diverter. However, those skilled in the art will readily appreciate that more than two vane elements can be provided without departing from the inventive aspects of the present disclosure.

It is envisioned that the plurality of vane elements are each adapted and configured to redirect fluid entering the fluid cell in the same direction. Alternatively, the vane elements can be arranged such that they direct the flow of fluid in differing directions.

In certain constructions of the present invention, the main body portion of the flow diverter includes radially opposed ends which define a radiused shoulder for supporting the flow diverter substantially within the fitting of the tank assembly. Still further, it is also envisioned that the plurality of vane elements can also each include a radiused shoulder for securing the flow diverter substantially within the fitting of the tank assembly.

Preferably, the retaining arms are resilient and can be flexed radially inward so as to allow the flow diverter to be inserted into the fitting of the tank assembly. In certain constructions, the radially outer surface of the retaining arms includes a projecting ledge that secures the flow diverter within the fitting of the tank assembly.

In certain embodiments of the present invention, the flow diverter defines at least one angled flow orifice for causing turbulent flow in the fluid cell of the tank assembly by redirecting fluid entering the tank assembly axially through the fitting in a non-axial direction into the fluid cell. Moreover, the flow diverter can include at least one angled vane for causing turbulent flow in the fluid cell of the tank assembly by redirecting fluid entering the tank assembly axially through the fitting in a non-axial direction into the fluid cell.

The present invention is also directed to a diaphragm-type well tank assembly that includes, inter alia, an outer housing, an inner liner, and a diaphragm. The housing defines an interior chamber and the inner liner is supported within the interior chamber of the housing and defines an interior cell. The diaphragm is supported within the inner liner and separates the interior cell into a water storage portion and a pressurized gas retaining portion.

The well tank assembly further includes a fitting secured to the outer housing which defines a flow port for allowing water to enter and exit the water storage portion of the interior cell from an exterior of the housing. Moreover, a flow diverter is associated with the fitting for causing turbulent flow within the water storage portion of the interior cell by redirecting fluid entering the tank assembly axially through the fitting in a non-axial direction into the water storage portion.

These and other features and benefits of the subject invention and the manner in which it is assembled and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the devices and systems of the subject invention without undue experimentation, preferred embodiments thereof will be described in detail hereinbelow with reference to certain figures, wherein:

FIG. 7 is a perspective view taken from within the fluid cell of the tank assembly which illustrates the manner in which the flow diverter of FIG. 4 causes turbulent flow within the cell;

FIG. 8 is a cross-sectional view of a portion of the flow diverter of FIG. 4 and the bottom of the tank assembly which illustrates the manner in which the flow diverter prevents the diaphragm from being drawn into the inlet/outlet fitting when all of the water has been discharged from within the fluid cell;

FIG. 9 provides a perspective view of an alternative embodiment for the flow diverter of the present invention; and FIG. 10 provides a perspective view from within the fluid cell of the tank assembly illustrating the manner in which the flow diverter of FIG. 9 creates turbulent flow within the fluid cell.

These and other aspects of the subject invention will become more readily apparent to those having ordinary skill in the art from the following detailed description of the invention taken in conjunction with the drawings.

DETAILED DESCRIPTION OF PREFERRED EMBODIMENTS

Disclosed herein are detailed descriptions of specific embodiments of the devices, systems and methods for causing turbulent flow in a tank assembly, such as a well tank. It will be understood that the disclosed embodiments are merely examples of the way in which certain aspects of the invention can be implemented and do not represent an exhaustive list of all of the ways the invention may be embodied. Indeed, it will be understood that the systems, devices, and methods described herein may be embodied in various and alternative forms. The figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

For ease of description, the components of this invention are described in an upright operating position, and terms such as upper, lower, front, rear, horizontal, etc., are used with reference to this position. It will be understood, however, that the components of this invention may be manufactured, stored, transported, used, and sold in an orientation other than the position described.

Figures illustrating the components show some mechanical elements that are known and will be recognized by one skilled in the art. The detailed descriptions of such elements are not necessary to an understanding of the invention, and accordingly, are herein presented only to the degree necessary to facilitate an understanding of the novel features of the present invention.

Figure 1:
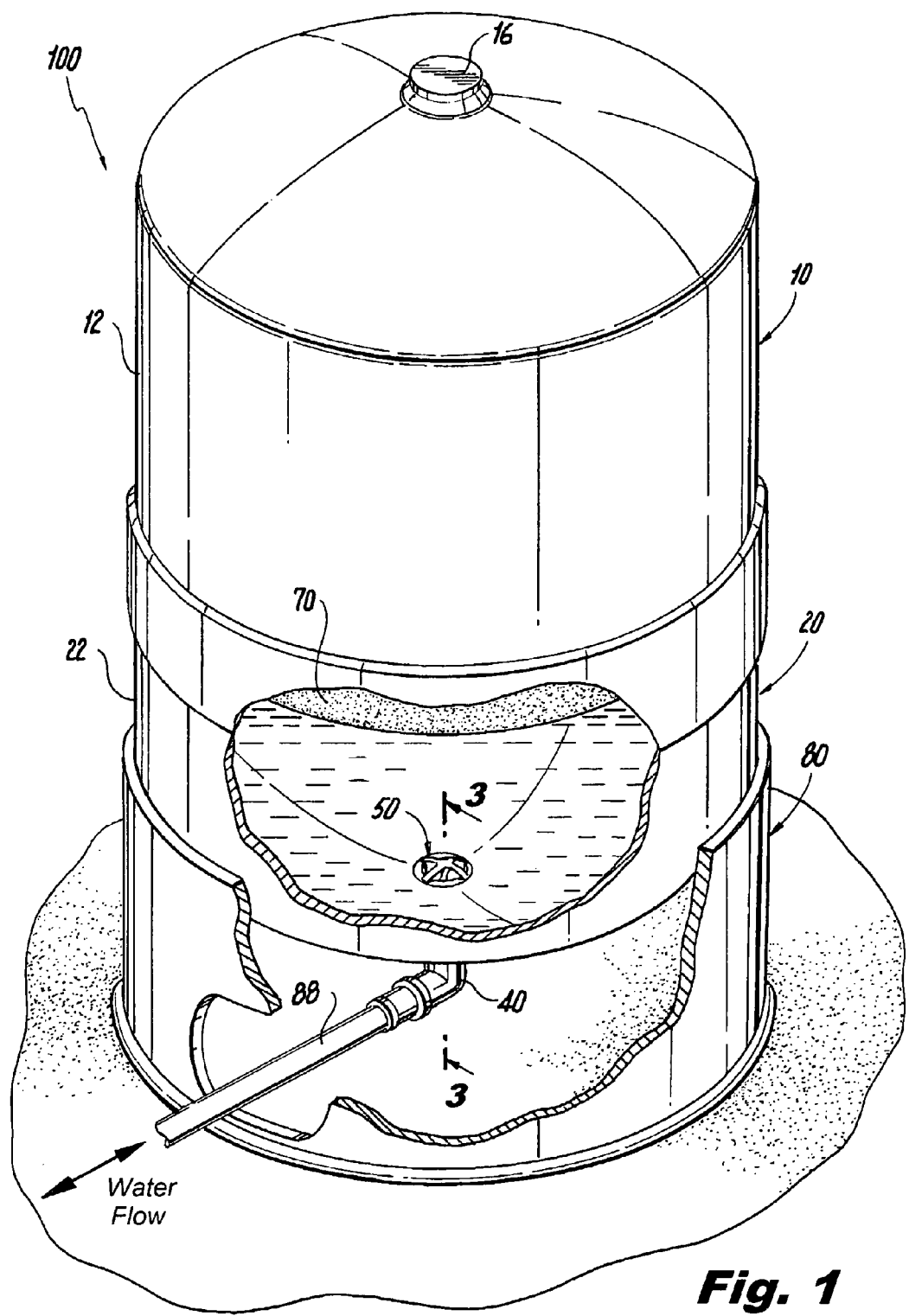
FIG. 1 is a perspective view of a tank assembly which has been constructed in accordance with a preferred embodiment of the present invention having portions of its stand and dome cut away for ease of illustration.

Referring now to the drawings wherein similar reference numerals identify similar structural features or aspects of the subject invention, there is illustrated in FIG. 1, an expansion tank or tank assembly which has been designated by reference numeral 100.

Figure 2:
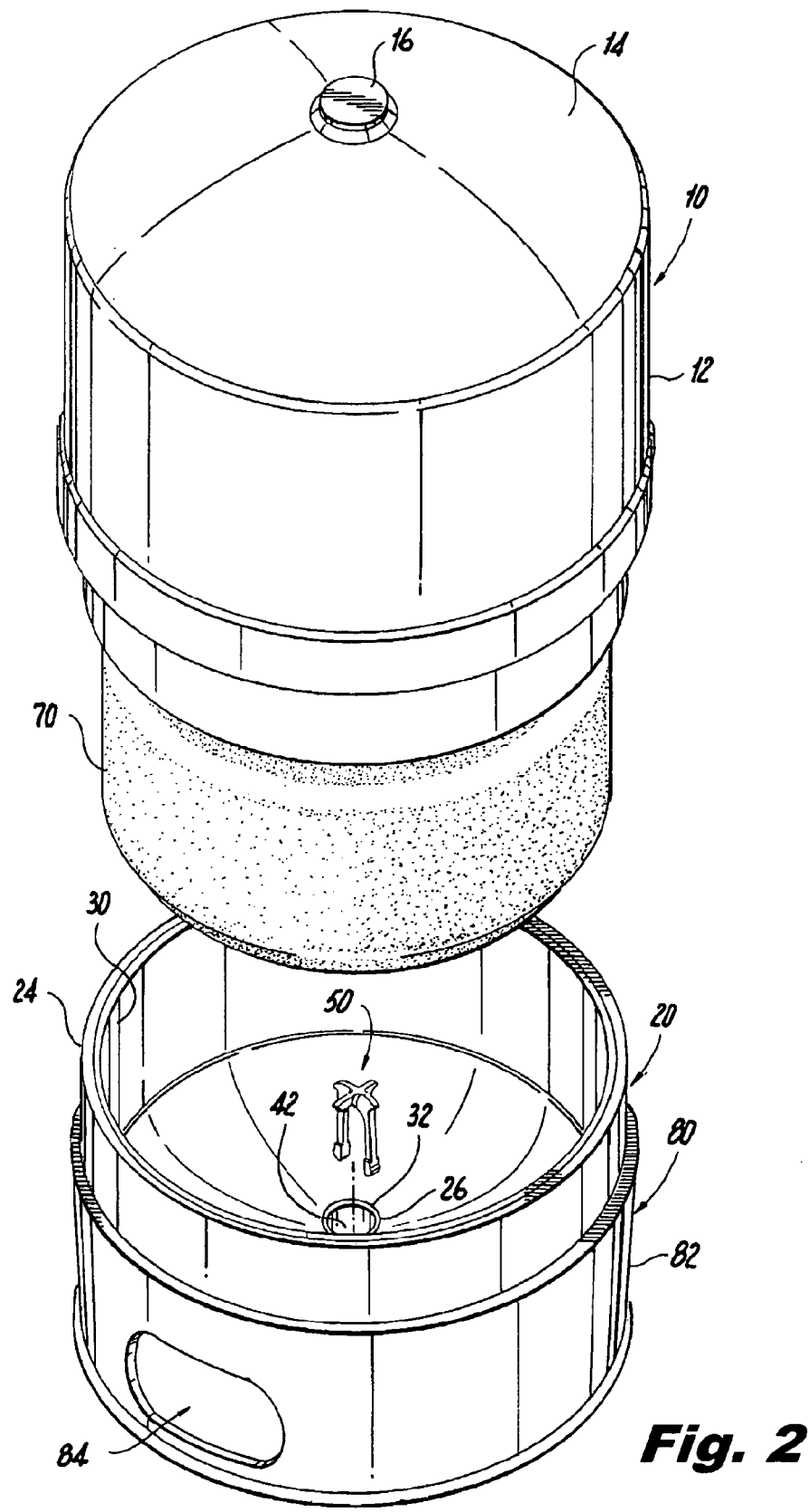
FIG. 2 is an exploded perspective view of the tank assembly of FIG. 1 wherein the upper and lower halves of the tank dome have been separated so as to show the interior of the fluid cell and the flow diverter.
Figure 3:
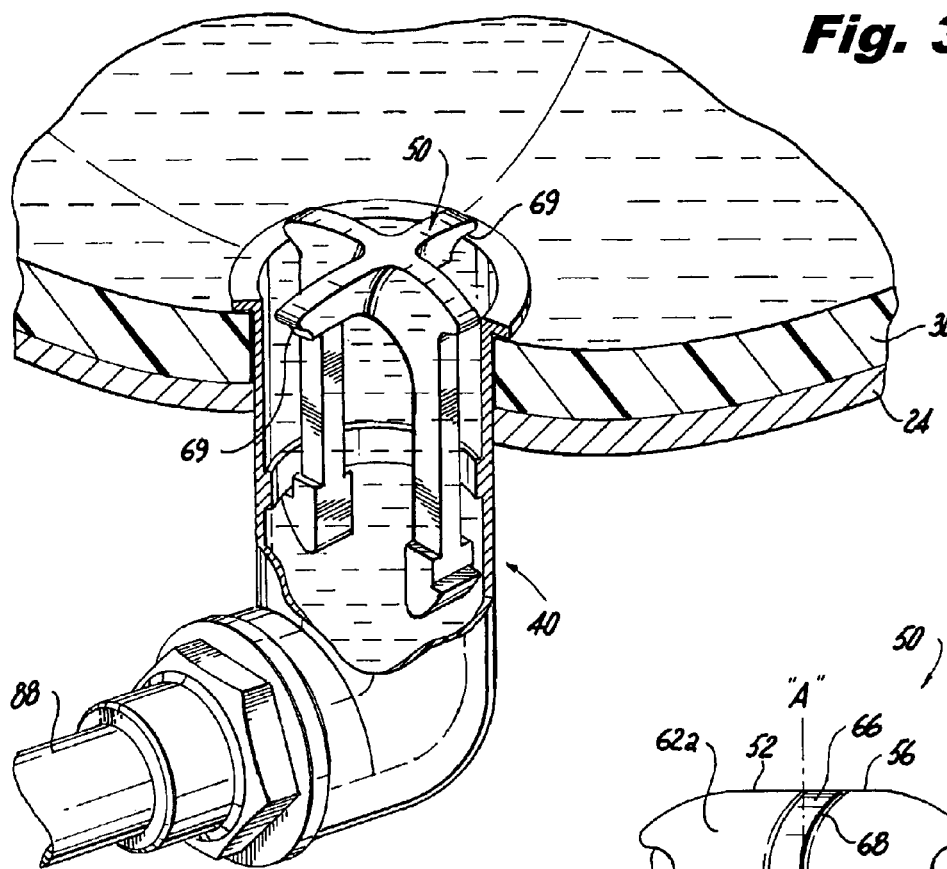
FIG. 3 is a partial cross-sectional view of the bottom of the tank assembly of FIG. 1 which illustrates the flow diverter of the present invention installed within the tank inlet/outlet fitting.

Expansion tank 100 includes upper cylindrical body 10 and lower cylindrical body 20. Upper cylindrical body 10 has a side wall 12 and an end wall 14, which is provided with an orifice (not shown—covered by cap 16). Lower cylindrical body 20 has a side wall 22 and an end wall 24 which is also provided with orifice 26 (see FIG. 2).

The interior surface of the lower end wall 24 and the lower portion of the lower side wall 22 are covered by a liquid-impervious liner 30, which is composed preferably of a plastic capable of withstanding temperatures of at least 212° F., such as, polypropylene, so that the water of a hot water heating system or a pressurized well water system is separated from the interior surfaces of the lower cylindrical body 20. Also, plastic liner 30 will not deteriorate due to the temperature or type of water with which expansion tank 100 is used. Liner 30 can be manufactured by any suitable technique known to the art; such as, vacuum forming, injection molding, etc.

The plastic liner 30 is formed with an orifice 32 which mates with orifice 26 in end wall 24 of lower cylindrical body 20. The portion of liner 30 adjacent the orifice is clamped to lower end wall 24, welded, brazed or otherwise suitably connected to tank 100 and adapted to connect expansion tank 100 with the water system of which it forms a part.

Flexible diaphragm 70, formed of butyl rubber or other elastomer, is disposed inside of lower cylindrical body 20 and is adapted to conform to the shape thereof. The manner in which diaphragm 70 is secured to lower cylindrical body 20 is not the subject of the present invention and therefore will not be discussed herein. However, U.S. Pat. No. 5,386,925 provides a representative method for securing an internal diaphragm within a well tank.

A conventional air check valve is secured in the orifice formed in the end wall 14 of the upper cylindrical body 10 and permits air under pressure to be introduced into the gas receiving section or gas cell 90 (see FIG. 6) between the diaphragm 70 and upper cylindrical body 10. After the pressure in gas cell 90 is raised to the desired value, the check valve is covered as shown.

When installed, expansion tank 100 is supported on stand 80. Stand 80 has a cylindrical side wall 82 which allows fitting 40 to extend below end wall 24 of the lower cylindrical body 20. Side wall 82 includes a cutout 84 for allowing the water supply/return line 88 to extend from the fitting 40 to the exterior of the tank assembly 100.

Figure 4:
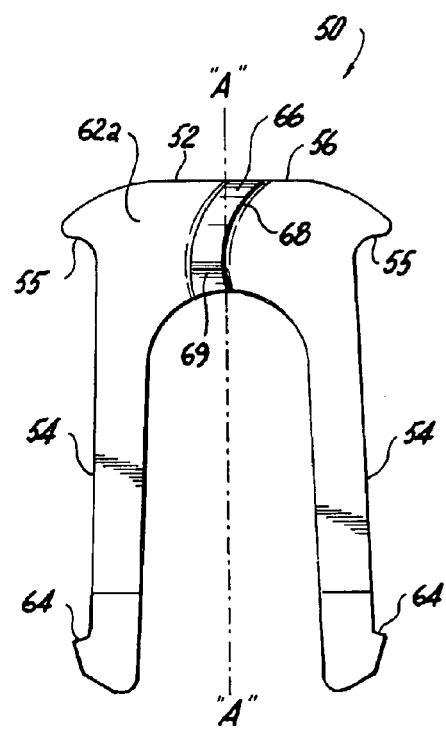
FIG. 4 is a side elevational view of an embodiment of the flow diverter of the present invention.
Figure 5:
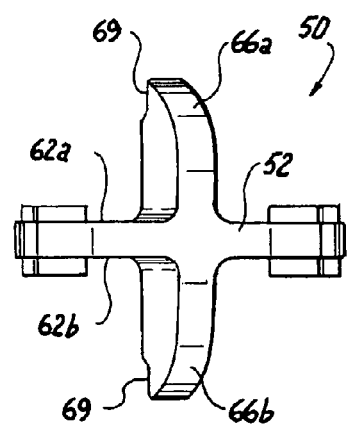
FIG. 5 is a top plan view of the flow diverter of FIG. 4.

A flow diverter insert 50 is positioned at least partially within orifice 42 of fitting 40. As best illustrated in FIGS. 4 and 5, flow diverter insert 50 includes, inter alia, a main body portion 52 and first and second retaining arms 54. The main body portion 52 defines a central axis "A" for the flow diverter 50 and has a top surface 56, a bottom surface 58 and radially opposed lateral side walls 62a/b.

The first and second retaining arms 54 extend from the bottom surface 58 of the main body portion 52 of flow diverter 50. Each retaining arm 54 includes a radially outer surface or ledge 64 located at a distal end thereof which is adapted and configured for supporting the flow diverter 50 substantially within the fitting 40 of the tank assembly 100.

Figure 6:
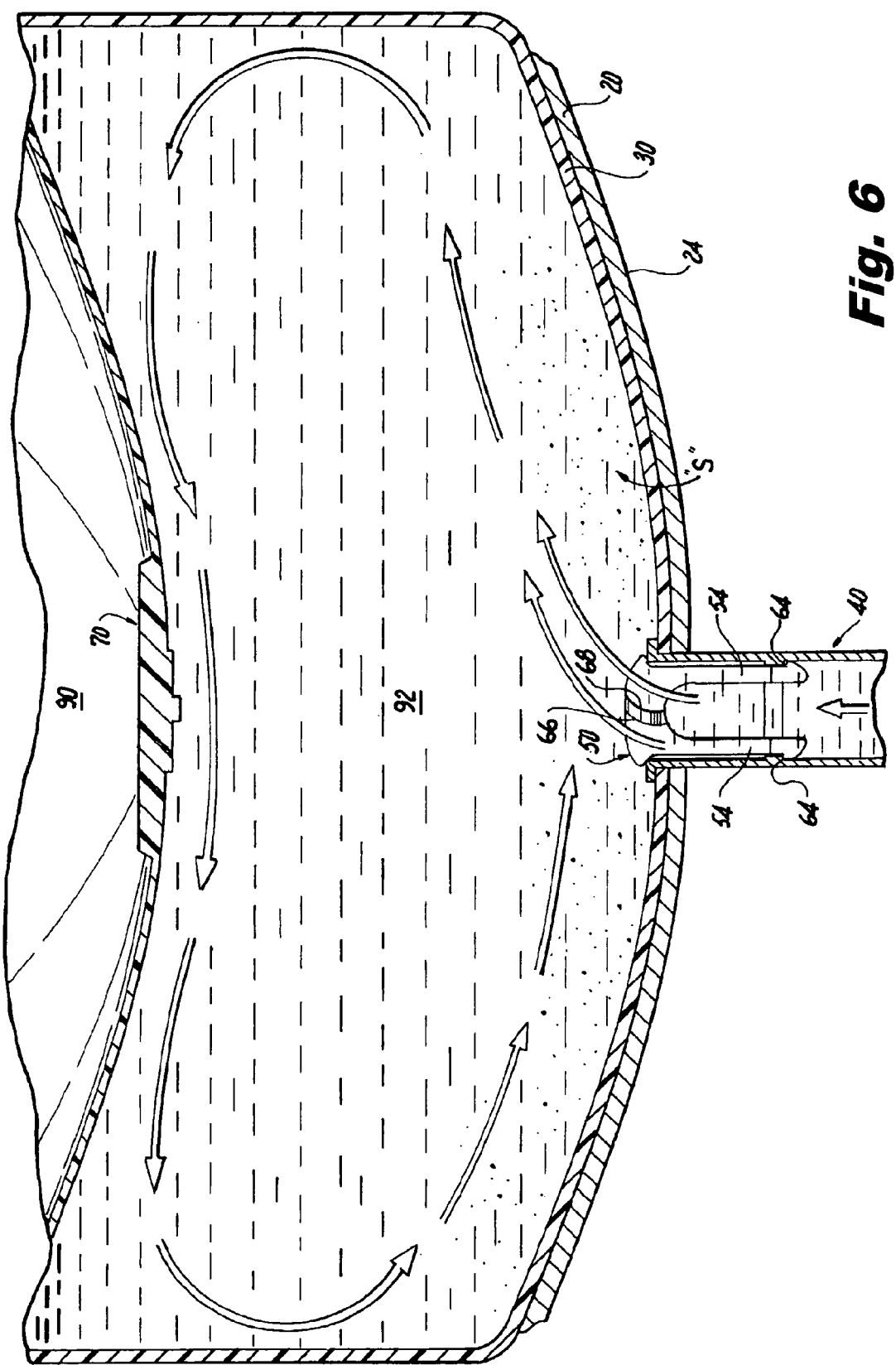
FIG. 6 is a cross-section view of the bottom of the tank assembly of FIG. 1 which illustrates the manner in which the flow diverter of FIG. 4 causes turbulent flow within the fluid cell of the tank assembly.

The flow diverter insert 50 further includes two vane elements 66a/b that extend from the opposing lateral side walls 62a/b of the main body portion 52. Each vane element 66a/b includes a curved surface 68 (see FIG. 4) which is adapted and configured for causing turbulent flow in the fluid cell 92 of the tank assembly 100. The manner in which the vane elements 66a/b create the turbulent flow within the fluid cell 92 is best shown in FIGS. 6 and 7. The curved surface 68 of vane elements 66 redirect the fluid entering the tank assembly 100 axially through the fitting 40 in a non-axial direction into the fluid cell 92. By directing the inlet flow in this manner, the fluid circulates within the fluid cell 92 as shown in FIG. 6. This turbulent circulation path allows the fluid to disrupt any stagnant pockets of fluid and to sweep up the sediment "S" that has collected along the bottom of the tank, so that it becomes suspended in the fluid for a period of time. Then when the fluid/water is needed by the system or within the residence the water and suspended sediment exit the tank and passes through a sediment filter, which removes sediment from within the tank and from the water supply.

As noted above, the flow diverter 50 is supported within fitting 40 and each retaining arm 54 includes a ledge 64 located at a distal end thereof which is adapted and configured for securing the flow diverter 50 substantially within the fitting 40.

Each end of the main body portion 52 of the flow diverter 50 and each vane element 66 includes a radiused shoulder, 55 and 69 respectively, which engages with the top of fitting 40 and in combination with ledges 64, secures the flow diverter 50 within the fitting 40.

In the embodiment shown herein, the retaining arms 54 are resilient and can be flexed radially inward, so as to allow the flow diverter 50 to be inserted into the fitting 40 of the tank assembly 100. When the flow diverter 50 is fully inserted within the fitting 40, the retaining arms 54 flex outward such that the ledges 64 engage with corresponding shoulders formed on the inside diameter of fitting 40, which prevents the removal of flow diverter 50 from within fitting 40.

As shown in FIGS. 4 and 6, each of vane elements 66 includes a curved surface 68 which redirects the fluid entering the fluid cell 92 in the same, non-axial direction. However, those skilled in the art will readily appreciate that in alternative embodiments, the vane elements 66 can be constructed such that they direct the flow of fluid in differing directions.

Referring now to FIG. 8 which illustrates a cross-section of the tank assembly 100 taken around the top of the fitting 40. This figure depicts the tank assembly 100 in the condition where almost all of the fluid has been removed from fluid cell 92. When this condition exists, the top surface 56 of the main body portion 52 of the flow diverter 50 prevents the diaphragm 70 from being drawn into the fitting 40 and possible be damaged.

Referring now to FIGS. 9 and 10 which illustrate an alternative embodiment of the flow diverter of the present invention which has been designated as reference number 150. Like the previously described embodiment, flow diverter insert 150 includes, inter alfa, a main body portion 152 and first and second retaining arms 154. The main body portion 152 defines a central axis "A" for the flow diverter 150 and has a top surface 156 and a bottom surface 158. The first and second retaining arms 154 extend from the bottom surface 158 of the main body portion 152 of flow diverter 150. Each retaining arm 154 includes a radially outer surface/ledge 164 located at a distal end thereof which is adapted and configured for supporting the flow diverter 150 substantially within a fitting of a tank assembly.

Unlike the previously described embodiment, wherein angled vane elements 66 were used to create the turbulent flow within the fluid cell of the tank, in this embodiment flow orifices 166 have been created in the main boy portion 152 of the flow diverter 150. There orifices 166 have been stamped into the main body portion 152 of the diverter 150, but other techniques can be used to form the orifices. Two of the orifices 166b/d have been completely stamped out along their outer diameter such that a circular piece of material has been removed. The remaining two orifices 166a/c have only been partially stamped out, such that a substantially circular tab 168 remains hanging from the main body portion 152 of the flow diverter 150. During the fabrication process, tabs 168 are arranged at an acute angle with respect to the top surface 156 of the main body 152 acts, so as to create vane elements that redirect the inflow from an axial direction to a non-axial direction, similar to vane elements 66 of flow diverter 50.

While the subject invention has been described with respect to preferred embodiments, those skilled in the art will readily appreciate that changes and modifications may be made thereto without departing from the spirit and scope of the subject invention as defined by the appended claims.

What is claimed is:

1. A device for causing turbulent flow in a tank assembly that has an internal fluid cell and a fitting for allowing fluid to enter and exit the fluid cell from the exterior of the tank assembly, the device comprising:
   a) a main body portion defining a central axis for the device and having a top surface, a bottom surface and radially opposed lateral side walls;
   b) first and second retaining arms which extend from the each of the radially opposed lateral side walls at the bottom surface of the main body portion of the device, each retaining arm including a radially outer surface located at a distal end thereof which is adapted and configured for supporting the device substantially within the fitting of the tank assembly; and
   c) a plurality of vane elements, wherein at least one vane element extends from each of the radially opposed lateral side walls of the main body portion of the device, each vane element including a curved surface which is adapted and configured for causing turbulent flow in the fluid cell of the tank assembly by redirecting fluid entering the tank assembly axially through the fitting in a non-axial direction into the fluid cell.

2. A device as recited in claim 1, wherein the device includes two vane elements, wherein one vane element projects from each of the opposing side walls of the main body portion of the device.

3. A device as recited in claim 1, wherein the plurality of vane elements are each adapted and configured to redirect fluid entering the fluid cell in the same direction.

4. A device as recited in claim 1, wherein the main body portion of the device includes radially opposed ends which define a radiused shoulder for supporting the device substantially within the fitting of the tank assembly.

5. A device as recited in claim 1, wherein the plurality of vane elements each define a radiused shoulder for securing the device substantially within the fitting of the tank assembly.

6. A device as recited in claim 1, wherein the retaining arms are resilient which allows the device to be inserted into the fitting of the tank assembly.

7. A device as recited in claim 1, wherein the radially outer surface of the retaining arms includes a projecting ledge that secures the device within the fitting of the tank assembly.

* * * * *